United States Patent

Meininger et al.

[15] 3,663,156
[45] May 16, 1972

[54] FAST DYEING CELLULOSE FIBROUS MATERIALS WITH REACTIVE WATER-SOLUBLE TRIFLUOROCYCLOBUTENYL AZO DYES

[72] Inventors: Fritz Meininger, Frankfurt/Main; Helmold Von Plessen, Hofheim/Taunus, both of Germany

[73] Assignee: Farbwerke Hoechst Aktiengesellschaft vormals Meister Lucius & Bruning, Frankfurt/Main, Germany

[22] Filed: Aug. 7, 1968

[21] Appl. No.: 750,779

[30] Foreign Application Priority Data

Aug. 12, 1967 Germany ..................... P 16 19 543.0
Aug. 12, 1967 Germany ........................... F53217

[52] U.S. Cl. .......................................... 8/54.2, 8/1 E, 8/1 L,
8/41 R, 8/41 B, 8/41 A, 8/13, 8/163, 260/199, 260/148

[51] Int. Cl. .............................. C09b 29/34, D06p 3/60
[58] Field of Search ............... 8/63, 1.29, 65, 34.2; 260/199, 260/148

[56] References Cited

UNITED STATES PATENTS 3,360,524 12/1967 Scherer et al. ................... 262/277
3,360,505 12/1967 Scherer ............................. 260/148 X
3,360,509 12/1967 Scherer ............................. 260/199 X

*Primary Examiner*—George F. Lesmes
*Assistant Examiner*—Patricia C. Ives
*Attorney*—Curtis, Morris and Safford

[57] ABSTRACT

A process for producing fast dyeings or prints on cellulose fibrous materials, which comprises treating the said fibrous materials in any sequence with an alkaline agent and a water-soluble dyestuff of the formula

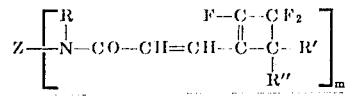

in which Z represents the radical of a water-soluble organic dyestuff molecule being linked to the identified side grouping directly or via the bridging member

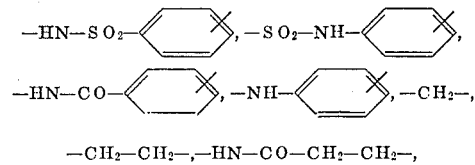

$-CH_2-CH_2-$, $-HN-CO-CH_2-CH_2-$,

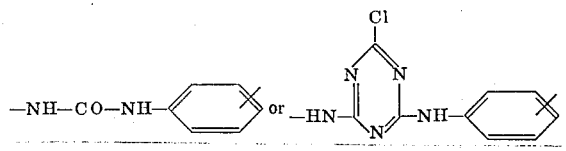

R represents hydrogen or lower alkyl, R' and R" represent hydrogen, lower alkyl or phenyl and $m$ represents the integer 1 or 2.

10 Claims, No Drawings

FAST DYEING CELLULOSE FIBROUS MATERIALS WITH REACTIVE WATER-SOLUBLE TRIFLUOROCYCLOBUTENYL AZO DYES

The present invention relates to new reactive mono- and disazo-dyestuffs or the general formula

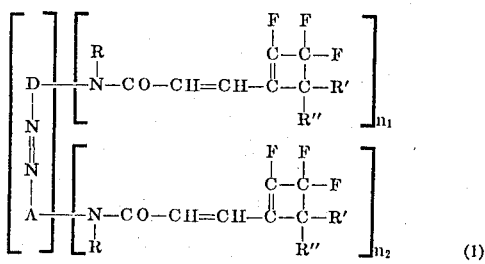

wherein D represents the radical of a diazo component of the benzene, diphenyl, stilbene or naphthalene series which may contain water-solubilizing groups such as sulfonic acid or carboxylic acid groups and, moreover, an azo group, A represents the radical of a coupling component of the benzene, naphthalene, aceto-acetic acid arylamide, pyrazolone, dihydroxyquinoline or barbituric acid series which may contain water-solubilizing groups, such as sulfonic or carboxylic acid groups, and, moreover, an azo group, R, R' and R'' represent hydrogen atoms, alkyl- or aryl groups and $n_1$, $n_2$ represent zero or 1 or 2, the sum of $n_1$ and $n_2$ being b 1 or 2, and to a process of their manufacture, which comprises coupling the diazo compound of a primary amine of the general formula

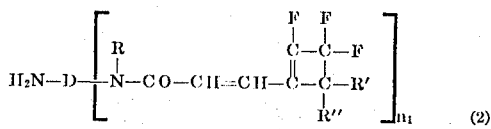

wherein D, R, R', R'' and $n_1$ are defined as above with a coupling component of the general formula

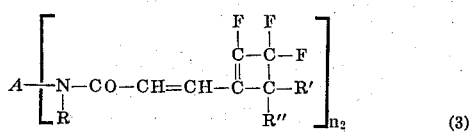

wherein A, R, R', R'' and $n_2$ are defined as above. The diazo and coupling components used are selected so that the resulting dyestuffs contain at least one water-solubilizing group, such as a sulfonic or carboxylic acid group, and 1 or 2 groupings of the general formula

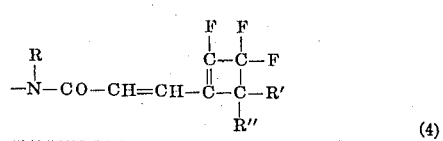

wherein R, R' and R'' are defined as above.

As regards the content of at least one water-solubilizing group, such as a carboxylic acid or sulfonic acid group, a monoazo dyestuff prepared according to the process of the present invention preferably contains two and a disazo dyestuff preferably contains three of such water-solubilizing groups to ensure sufficient water-solubility. The water-solubilizing groups in the diazo and/or coupling component may occupy any position in the dyestuff molecule.

As diazo components, for example, the following primary amines may be used:
aminobenzene,
3-amino-6-chlorotoluene-4-sulfonic acid,
2-aminonaphthalene-1,5-disulfonic acid,
4-amino-azobenzene-4'-sulfonic acid,
2-naphthylamino-4,6,8-trisulfonic acid,
2-aminophenol-4-sulfonic acid,
2-aminophenol-4,6-disulfonic acid,
6-chloro-2-aminophenol-4-sulfonic acid,
4-amino-1-[β-(2',3',3'-trifluorocyclobutenyl-(1',2'))-acryloyl-amino]-benzene,
4-amino-1-[β-(2', 3', 3'-trifluorocyclobutenyl-(1', 2'))-acryloyl-amino]-benzene-3-sulfonic acid,
4-amino-1-[β-(2', 3', 3'-trifluoro-4'-methyl-cyclobutenyl-(1',2'))-acryloyl-amino]-benzene-3-sulfonic acid,
2-aminobenzene-sulfonic acid → 1-naphthylamine-6-sulfonic acid,
1-naphthylamine-4,7-disulfonic acid → 2-acetylamino-8-hydroxynaphthalene-6-sulfonic acid.

Suitable coupling components are, for example, hydroxybenzenes, aminobenzenes, hydroxynaphthalenes and aminonaphthalenes, as well as aliphatic or heterocyclic enols and enamines such, for example, as aceto-acetic acid aryl amides, malonic acid ester, pyrazolone derivatives, barbituric acid and dihydroxyquinoline. These components can, for example, be prepared by reacting suitably substituted primary or secondary amines with an acid chloride of the formula

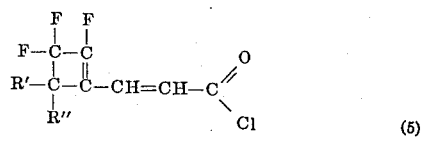

wherein R and R'' are defined as above. Such reactions are suitably carried out in an aqueous solution at temperatures ranging from about 0° C. to about 60° C., preferably between about 0° C. and about 10°
the pH being maintained in a weakly acid range in the presence or by gradual addition of agents binding or neutralizing mineral acid, such, for example, as sodium acetate, sodium hydroxide or sodium carbonate. If required, the pH is maintained in a neutral or weakly alkaline range by the addition of buffer salts.

The aforementioned acid chloride of the formula (5) may be prepared by treating β-(2,2,3,3,-tetrafluorocyclobutyl)-acrylic acid with alkalies or tertiary amines and by subsequent reaction with thionyl-chloride.

As appropriate coupling and diazo components containing a radical of the formula (4) there may be cited:

a. as diazo components: the reaction products of 1 mol of the compound having the formula (5) with 1 mol of 1,3-diaminobenzene or 1,4-diamino-benzene, 1,3-diaminobenzene-4-sulfonic acid or 1,4-diamino-benzene-3-sulfonic acid, 1,4-diaminobenzene-2-carboxylic acid, 4,4'-diamino-stilbene-2,2'-disulfonic acid, 4-(4'-aminobenzoyl-amino)-1-amino-benzene-2-sulfonic acid, 2-methoxy-1,4-diamino-benzene-5-sulfonic acid, 2,6-diaminonaphthalene-4,8-disulfonic acid, 4,4'-diamino-3-methoxyazobenzene-3'-sulfonic acid, 4,4'-diamino-1,1'-diphenyl-3-sulfonic acid, 4,4'-diamino-2,2'-dimethyl-1,1'-diphenyl-5-sulfonic acid, 4,4'-diamino-2,2'-dichloro-1,1'-diphenyl-5-sulfonic acid or compounds of the formula

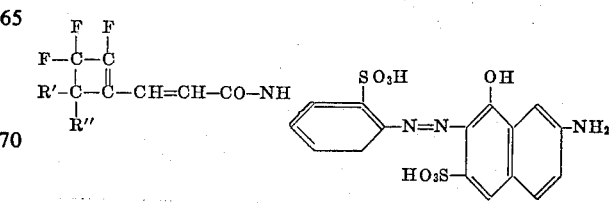

wherein R' and R'' have the meanings indicated above.

b. as coupling components: the reaction products of 1 mol of a compound of the formula (5) with 1 mol of 1-amino-8-hydroxynaphthalene3,6-or 4,6-disulfonic acid, 2-amino-8-hydroxynaphthalene-6-sulfonic acid, 2-amino-5-hydroxynaphthalene-7-sulfonic acid, 1-amino-5-hydroxynaphthalene-7-sulfonic acid, 2-amino-5-hydroxynaphthalene-1,7-disulfonic acid, 2-(4'-aminobenzoylamino)-5-hydroxynaphthalene-7-sulfonic acid, 1-(3'- or 4'-aminobenzoylamino)-8-hydroxynaphthalene-3,6, or -4,6-disulfonic acid, 1-acetoacetylamino-4-amino-benzene-3-carboxylic acid or -3-sulfonic acid, 1-acetoacetylamino-4'-amino-stilbene-2,2'-disulfonic acid, 1-(3'- or 4'-aminophenyl)-5-pyrazolone-3carboxylic acid or with 1 mol of a compound having the formula

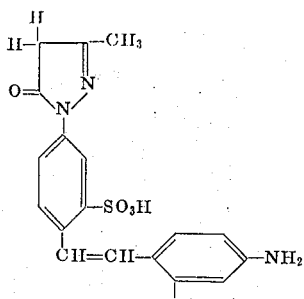

or

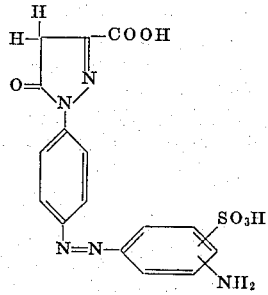

For preparing these components the acid chloride of the formula (5) may either be used as such, if required, with addition of an emulsifier so as to achieve a better distribution in the aqueous phase, or in solution in an appropriate organic solvent such as chloroform or acetone.

The dyestuffs obtainable according to the process of the present invention may contain besides the water-solubilizing groups further substituents usual in azo-dyestuffs such as alkyl, sulfonamide, acylamino, arylamino, nitro and cyano groups, moreover, hydroxy, urea and alkoxy groups and halogen atoms such as chlorine or fluorine. Besides these substituents the dyestuff molecule may carry other reactive groupings such, for example, as mono or dihalogeno-triazinyl-amino groups, di- or trihalogeno-pyrimidylamino groups, moreover, hydroxyalkylsulfonamide- or hydroxyalkyl-sulfone groups esterified with sulfuric acid, halogen -acylamino, acrylamino, urethane, halogen alkyl, epoxyde or isothiocyanate groups.

The new dyestuffs are suitable for dyeing and printing the most various materials such as silk, wool, leather, synthetic polyamides and polyurethanes, regenerated or natural protein and cellulose materials, in particular, cotton, linen or viscose rayon. They are applied according to dyeing and printing methods generally used in industry.

The new dyestuffs are particularly valuable as reactive dyestuffs in dyeing textile materials containing cellulose. For this purpose they are applied to cellulose textile materials, for example, according to the direct dyeing method by padding or as printing paste in connection with a treatment with an acetic acid-binding agent, such, for example, as sodium hydroxide, sodium carbonate or sodium bicarbonate, sodium meta-silicate or trisodiumphosphate. The acid-binding agent may be used prior to, during or after applying the dyestuff. The dyestuff is fixed at normal temperature or with heating, e.g., by steam. By dyeing according to usual dyeing methods from a weakly acid, neutral or weakly alkaline dyestuff solution the dyestuffs can also be applied to wool, silk, regenerated protein, polyamide and modified polyacryl-nitrile textile materials. The pH value of the dye-bath may, during the dyeing, be adjusted by addition of appropriate substances, so for example, that the dyeing starts with a pH value of 4 which in the course of dyeing is increased to about 6,5–7,5 or, if desired, still further. There may be added to the dye-bath substances that are customarily used in dyeing textile materials containing nitrogen such, for example, as ammonium acetate, sodium sulfate, non-ionized dispersion agents such as the condensates of ethylene oxide with amines, fatty alcohols or phenols, cationic substances such as quaternary ammonium salts and organic liquids such as n-butanol and benzylalcohol.

The dyestuffs may also be applied according to customary printing methods to silk, wool or textile materials made from regenerated protein fibers.

If the dyestuffs contain complex-metal-forming groups, such for example, as o,o'-dihydroxy-azo groupings or o,o'-hydroxy-carboxy-azo groupings the resulting dyeings may be treated with metal-yielding agents, for example chrome- or copper yielding compounds according to customary methods which substantially are known. The dyeings obtainable with the water-soluble azo-dyestuffs of specified kind on cellulose fibers are, as a rule, distinguished by purity of their tints and a high tinctorial strength. In connection with a treatment with an acid binding agent, there are obtained on cellulose textile materials full shades showing good to very good fastness to washing and light. In comparison with the dyestuffs described in Canadian Pat. No. 735,445, the dyestuffs obtained according to the process of the present invention are distinguished by a considerably higher tinctorial strength in the printing and dyeing of cotton and by better properties of industrial applicability such as a lower charge of fluorine in the waste water and less tendency to foam at printing. The following Examples serve to illustrate the invention; the parts being by weight unless otherwise stated.

EXAMPLE 1

22.2 Parts of 3-amino-6-chlorotoluene-4-sulfonic acid were dissolved with sodium carbonate in 300 parts by volume of water at a pH value of 8 and 20 parts by volume of 5-normal sodium nitrite solution were added thereto. The solution obtained was run with stirring into a mixture of 400 parts of ice and 25 parts by volume of concentrated hydrochloric acid. The resulting diazo suspension was adjusted with sodium carbonate to a pH value of 7 and subsequently introduced into a solution of 47,9 parts of 1-[β-(2'-,3',3'-trifluorocyclobutenyl)-acryloylamino]-8-hydroxy-naphthalene-3,6-disulfonic acid in 400 parts by volume of water (dissolved with sodium carbonate at a ph value of 7) the ph value being maintained with a sodium carbonate solution at 7,0–7,5. The mixture was stirred on for 12 hours at room temperature. BY salting out with sodium or potassium chloride there was obtained a dyestuff which in the form of the free acid corresponded to the formula

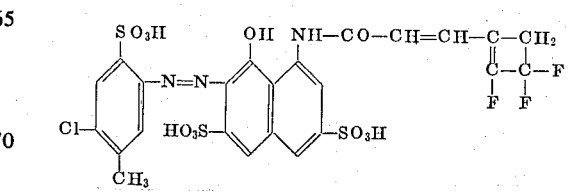

In the presence of agents having an alkaline action it yielded on cotton bluish red dyeings and prints having a very good fastness to wet processing while on wool materials dyed in an acid bath bluish red dyeings of good fastness to light and wet processing were produced.

EXAMPLE 2

30.3 Parts of 2-amino-naphthalene-1,5-disulfonic acid were dissolved in 300 parts by volume of water while adding sodium carbonate at a pH value of 8. The solution obtained was mixed with 20 parts by volume of a 5n-sodium nitrite solution and run while stirred into a mixture of 400 parts of ice and 25 parts by volume of concentrated hydrochloric acid. The resulting diazo solution was adjusted with sodium carbonate to a pH value of 7 and subsequently introduced into a solution of 41.3 parts of 2-[β-(2',3',3'-trifluorocyclobutenyl)-acryloyl-methylamino]-5-hydroxynaphthalene-7-sulfonic acid in 400 parts by volume of water (dissolved at a pH value of 7 with sodium carbonate). Simultaneously, a pH value of 7,0–7,5 was maintained with sodium carbonate. The reaction mixture was stirred for 12 hours at room temperature. By salting out with sodium chloride the dyestuff corresponding in the form of the free acid to the formula

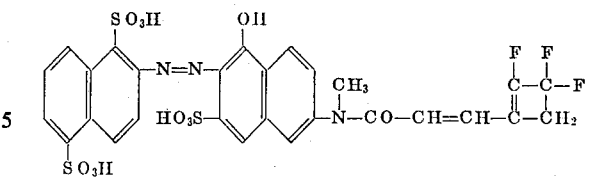

was isolated. In the presence of agents having an alkaline action it yielded on cellulose fibers orange dyeings and prints having a very good fastness to wet processing. Dyeings produced on wool materials in an acid bath were distinguished by good fastness to wet processing.

The following Table shows in column I diazo components and in column II coupling components for preparing further monoazo dyestuffs according to the method specified in example 1 and 2 which dye cellulose fibers or wool the shades indicated in column III:

| | Diazo-component I | Coupling component II | Shades obtained on wool |
|---|---|---|---|
| 3 | HO₃S—naphthalene—NH₂, SO₃H | OH—naphthalene(HO₃S)—NH—CO—CH=CH—C(=C(F)—CF₂)— | Orange. |
| 4 | HO₃S—naphthalene—NH₂, SO₃H | OH, NH—CO—CH=CH—C(=C(F)—CF₂)— naphthalene(HO₃S)(SO₃H) | Bluish red. |
| 5 | HO₃S—C₆H₄—NH₂ | Same as above | Do. |
| 6 | SO₃H—C₆H₄—NH₂ | do | Do. |
| 7 | SO₃H—C₆H₃(Cl)(Cl)—NH₂ | do | Red. |
| 8 | C₆H₅—NH—C₆H₃(SO₃H)—NH₂ | do | Navy blue. |
| 9 | SO₃H—naphthalene(HO₃S)—NH—CO—C₆H₄—NH₂ | do | Bluish red. |
| 10 | HO₃S—naphthalene—NH₂, SO₃H | OH—naphthalene(HO₃S)—NH—CO—CH=CH—C(=C(F)—CF₂)— | Red. |
| 11 | OCH₃—C₆H₃(HO₃S)—NH₂ | Same as above | Red. |

| Diazo-component I | Coupling component II | Shades obtained on wool |
|---|---|---|
| 12. HO₃S–⟨benzene⟩–NH₂ | ⟨naphthalene with OH, HO₃S, N(CH₃)–CO–CH=CH–C(=CF₂)–CH₂–F⟩ | Red. |
| 13. ⟨benzene with OCH₃, NH₂, HO₃S, OCH₃⟩ | ⟨naphthalene with OH, HO₃S, NH–CO–CH=CH–C(–CF₂–CH₂)(F)⟩ | Red. |
| 14. ⟨benzene with NH₂, H₃CO, SO₃H⟩ | Same as above | Red. |
| 15. ⟨naphthalene with SO₃H, NH₂, SO₃H⟩ | ⟨naphthalene with OH, HO₃S, NH–CO–phenyl–NH–CO–CH=CH–C(=C(F)(CH₂))–CF₂–F⟩ | Orange. |
| 16. HO₃S–⟨benzene⟩–NH₂ | ⟨naphthalene with OH, NH–CO–CH=CH–C(=C–F)(CH₂–C–F), HO₃S, SO₃H⟩ | Red. |

EXAMPLE 17

13.4 Parts of 4-amino-1-[β-(2',3',3'-trifluorocyclobutenyl-(1',2'))-acryloylamino]-benzene were dissolved, while heated, in 200 parts by volume of water and 50 parts by volume of alcohol and the solution formed was dropped, simultaneously with 50 parts by volume of a 1n-sodium nitrite solution while stirred into a mixture of 500 parts of ice and 15 parts by volume of concentrated hydrochloric acid. The whole was stirred on for 2 hours at 0°–5° C. Then the pH value of the diazo solution was adjusted with sodium carbonate to 7 and run while maintaining the pH value constant with sodium carbonate into an aqueous solution of sodium salt of 15.2 parts of 1-hydroxynaphthalene-3,6-disulfonic acid. The reaction mixture was stirred further for 12 hours at room temperature, then the dyestuff was salted out with sodium chloride. The dyestuff obtained which in the form of the free acid corresponded to the formula

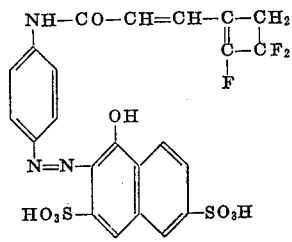

yielded, in the presence of agents having an alkaline action, on cellulose fibers red dyeings and prints of good fastness to wet processing. Also wool materials dyed in an acid bath showed good fastness to wet processing.

EXAMPLE 18

9.3 Parts of aminobenzene were diazotized in known manner. The resulting acid diazo solution was adjusted with sodium carbonate to a pH value of 7 and introduced into a sodium salt solution of 47.9 parts of 1-[β-(2',3',3'-trifluorocyclobutenyl-(1',2')]-8-hydroxynaphthalene-3,6-disulfonic acid in 400 parts by volume of water in a manner to allow the pH value to be maintained with sodium carbonate at 7,0–7,5. The coupling mixture was stirred on for 12 hours at room temperature. By salting out with sodium chloride there was obtained a dyestuff which in the form of the free acid corresponded to the formula

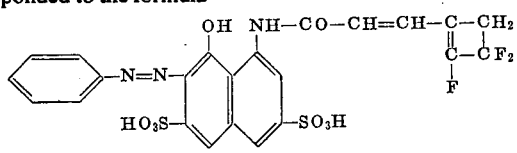

It yielded on cotton in the presence of alkalies bluish red dyeings of good fastness to wet processing. Also wool materials dyed in an acid bath showed dyeings of good fastness to wet processing.

EXAMPLE 19

13.4 Parts of 4-amino-1-[β-(2',3',3'-trifluorocyclobutenyl-(1',2'))-acryloylamino]-benzene were diazotized as described in example 17. The resulting acid diazo solution was adjusted by means of sodium carbonate to a pH value of 7. Then while maintaining the pH value constant a sodium salt solution of 19.2 parts of 3-methyl-1-(2'-naphthyl)-pyrazolone-(5)-4',8'-disulfonic acid in 400 parts by volume of water was added thereto and the whole was stirred on for several hours at room temperature. Then the dyestuff was salted out by means of sodium chloride and potassium chloride. The resulting dyestuff corresponded in the form of the free acid to the formula

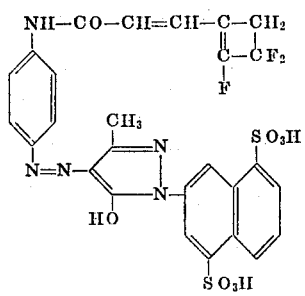

and yielded under alkaline conditions on cotton yellow dyeings and prints having a good fastness to wet processing. On wool materials dyed in an acid bath it yielded dyeings of good fastness to wet processing.

EXAMPLE 20

34.8 Parts of 4-amino-1-[β-(2',3',3'-trifluorocyclobutenyl-(1',2'))-acryloylamino]-benzene-3-sulfonic acid were dissolved in 500 parts by volume of water with addition of sodium carbonate at a pH value of 7 and diazotized as described in example 1. After adjusting the pH value to 7 the diazo suspension was introduced into a sodium salt solution of 25.4 parts of 3-methyl-1-(4'-sulfophenyl)-pyrazolone-(5) and the pH value was maintained constant by adding sodium carbonate. After stirring the mixture for several hours at room temperature the dyestuff was salted out with potassium or sodium chloride and dried. The dyestuff obtained which in the form of the free acid corresponded to the formula

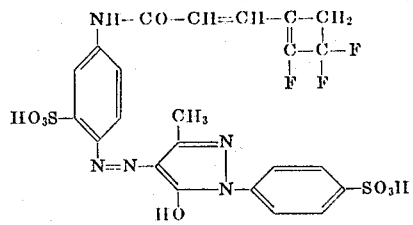

dyed under alkaline conditions cellulose fibers a yellow shade possessing a good fastness to washing and yielded also on wool yellow dyeings of good fastness to wet processing.

In the same manner as specified in the preceding example there could be produced yellow monoazo dyestuffs of analogous fastness properties from the diazo components (I) and coupling components (II) of the following table.

| | Diazo-component I | Coupling component II | Shades obtained on wool |
|---|---|---|---|
| 21 | NH—CO—CH=CH—C—CH₂ with C=CF₂, F; phenyl with —NH₂ and SO₃H | CH₃, pyrazole-N-naphthyl with SO₃H, SO₃H | Yellow. |
| 22 | Same as above | OCH₃, Cl, pyrazole-N-phenyl-SO₃H | Do. |
| 23 | do | COOH, Cl, pyrazole-N-phenyl-SO₃H | Do. |
| 24 | do | COOH, pyrazole-N-phenyl-SO₃H | Do. |
| 25 | do | OH, quinoline with SO₃H, HO— | Do. |
| 26 | do | HO₃S-naphthyl-NH—CO—CH₂—CO—CH₃, HO₃S— | Greenish yellow. |

EXAMPLE 27

36.2 Parts of 4-amino-1-[β-(2',3',3'-trifluoro-4'-methyl-cyclobutenyl-(1',2'))-acryloylamino]-benzene-3-sulfonic acid were diazotized as described in example 20. The diazo suspension was adjusted with sodium carbonate to a pH value of 7 and run into a sodium salt solution of 36.1 parts of 1-acetylamino-8-hydroxy-naphthalene-3,6-disulfonic acid the pH value being maintained constant. After stirring for several hours at room temperature at a pH value between 6,5 and 7,0 the dyestuff was salted out with sodium or potassium chloride and dried in vacuo at 30° C. The dyestuff obtained which corresponded in the form of the free acid to the formula

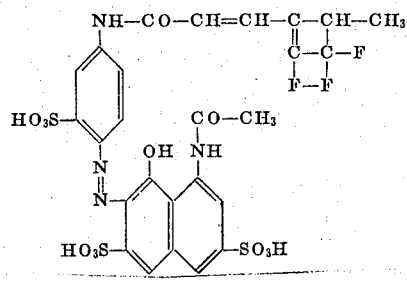

yielded on cotton under alkaline conditions as well as on wool from an acid bath bluish red dyeings of good fastness to wet processing.

EXAMPLE 28

13.4 Parts of 4-amino-1-[β-(2',3',3'-trifluorocyclobutenyl-(1',2'))-acryloylamino]-benzene were diazotized as described in example 17. The diazo solution adjusted with sodium carbonate to a pH value of 7 was introduced into an aqueous sodium salt solution of 31.7 parts of 1-amino-2-(2'-azo-4',8'-disulfonaphthalene)-8-hydroxynaphthalene-3,6-disulfonic acid (obtainable by coupling diazotized 2-naphthylamino-4,8-disulfonic acid with 1-amino-8-hydroxynaphthalene-3,6-disulfonic acid in an acid medium) and during the coupling reaction the pH value was maintained with sodium carbonate at 7,0-7,5. The coupling mixture was stirred on for 12 hours at room temperature and the dyestuff salted out with sodium chloride. The dyestuff obtained which in the form of the free acid corresponded to the formula

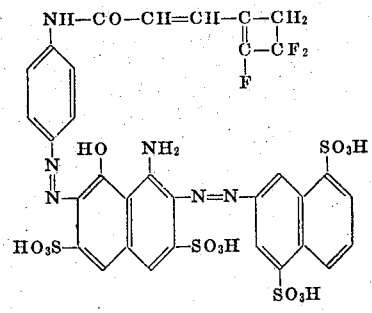

yielded on cellulose materials in the presence of compounds having an alkaline action and on wool dyed in an acid bath bluish green dyeings of good fastness to wet processing.

EXAMPLE 29

27.7 Parts of 4-amino-azobenzo-4'-sulfonic acid were diazotized as described in example 1. To the resulting diazo suspension adjusted with sodium carbonate to a pH value of 7,0-7,5 there was added an aqueous solution of 47.9 parts of 1-[β-(2',3',3'-trifluorocyclobutenyl-(1',2'))-acryloylamino]-8-hydroxynaphthalene-3,6-disulfonic acid adjusted with sodium carbonate to a pH value of 7 and the pH value was maintained by means of sodium carbonate within 7,0-7,5. After stirring the coupling mixture for 12 hours at room temperature the dyestuff was salted out with sodium chloride. The resulting dyestuff which in the form of the free acid corresponded to the formula

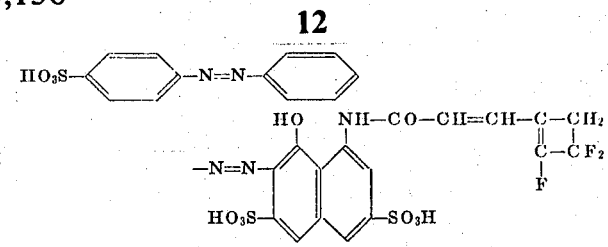

dyed cellulose fibers, under alkaline conditions, bluish red shades of good fastness to washing.

EXAMPLE 30

40.7 Parts of a monoazo dyestuff of the formula

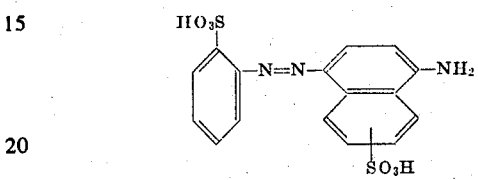

(obtainable by coupling diazotized 2-aminobenzene-sulfonic acid with 1-naphthylamine-(6+7)-sulfonic acid in an acid medium) were diazotized as described in example 1. After setting up with sodium carbonate a pH value of 7,0-7,5 the diazo suspension was run into an aqueous sodium salt solution of 47.9 parts of 1-[β-(2', 3',3'- trifluorocyclobutenyl-(1',2'))-acryloylamino]-8-hydroxynaphthalene-3,6-disulfonic acid and the pH value was during the coupling reaction maintained at 7,0-7,5. After stirring on for 12 hours at room temperature the dyestuff was salted out with sodium chloride. The resulting dyestuff which in the form of the free acid corresponded to the formula

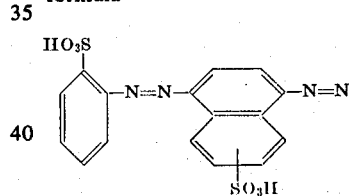

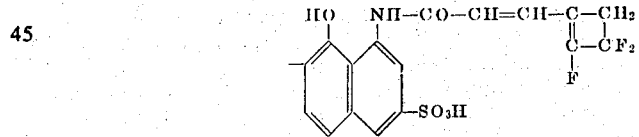

yielded on cotton, under alkaline conditions navy blue dyeings and prints of good fastness to wet processing.

EXAMPLE 31

55.3 Parts of a monoazo dyestuff of the formula

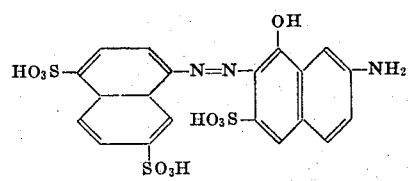

(obtainable by coupling diazotized 1-naphthylamino-4,7-disulfonic acid with 2-acetylamino-8-hydroxynaphthalene-6-sulfonic acid in an alkaline medium and by subsequent hydrolysis of the acetyl group) were diazotized as described in example 1. Then the diazotization mixture was adjusted with sodium carbonate to a pH value of 7 and run into a sodium salt solution of 47.9 parts of 1-[β-(2',3',3'-trifluorobutenyl -(1',2'))-acryloylamino]-8-hydroxynaphthalene-3,6-disulfonic acid while maintaining during the coupling reaction a pH value of 7,0-7,5. After stirring the mixture for 12 hours the dyestuff was salted out with potassium chloride. The resulting dyestuff which in the form of the free acid corresponded to the formula

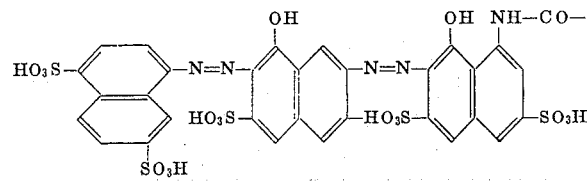

yielded on cotton under alkaline conditions violet dyeings and prints of good fastness to wet processing.

EXAMPLE 32

38.3 Parts of 2-naphthylamino-4,6,8-trisulfonic acid were diazotized as described in example 1. To the acid diazo solution (pH 2) there was added an aqueous solution of 34.8 parts of 3-amino-1-[β-(2',3',3'-trifluorocyclobutenyl-(1',2'))-acryloylamino]-benzene-4-sulfonic acid and the pH was adjusted to 3 by means of a sodium acetate solution. The coupling mixture was stirred on for 60 hours at room temperature at a pH value of 3. Then the pH value was adjusted with sodium carbonate to 6 and the dyestuff salted out with sodium chloride. The resulting dyestuff which in the form of the free acid corresponded to the formula

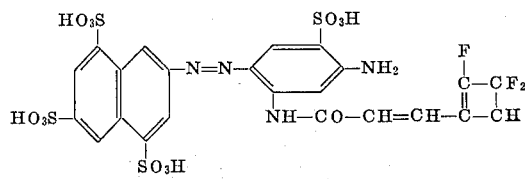

yielded on cotton under alkaline conditions and also on wool dyed from an acid bath yellow dyeings of good fastness to wet processing.

EXAMPLE 33

18.9 parts of 2-aminophenol-4-sulfonic acid were diazotized as described in example 1. The resulting diazo solution was adjusted with sodium carbonate to a pH value of 7,5 and a sodium salt solution of 39.9 parts of 2-[β-(2',3',3'-trifluorocyclobutenyl-(1',2'))-acryloylamino]-5-hydroxynaphthalene-7-sulfonic acid was added thereto. The reaction mixture was then heated to 35°–40° C. the pH value being maintained with sodium carbonate solution at 7,8–8,2. After stirring the mixture for several hours the pH was adjusted to 4 by means of 2n-hydrochloric acid and the dyestuff was salted out with sodium chloride. The resulting dyestuff which in the form of the free acid corresponded to the formula

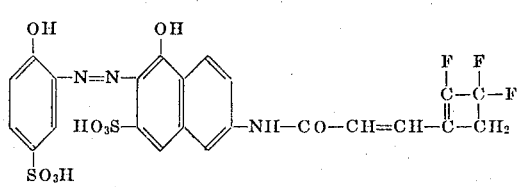

could be fixed on cellulose fibers in the presence of sodium carbonate. Subsequent treatment of the dyeing with a copper sulfate solution provided a ruby red shade possessing a good fastness to washing and light. Example 34

26.9 Parts of 2-aminophenol-4,6-disulfonic acid were diazotized as described in example 1. After the pH value was adjusted to 7,5 with sodium carbonate the diazo solution was run into a sodium salt solution of 39.9 parts of 2-[β-(2',3',3'-trifluorocyclobutenyl-(1',2'))-acryloylamino]-5-hydroxynaphthalene-7-sulfonic acid and the mixture was heated for several hours at 35°–40° C. the pH value being maintained constant with a sodium carbonate solution. Then the reaction mixture was adjusted with dilute hydrochloric acid to a pH value of 5 the the dyestuff was salted out with sodium or potassium chloride. The dyestuff obtained which in the form of the free acid corresponded to the formula

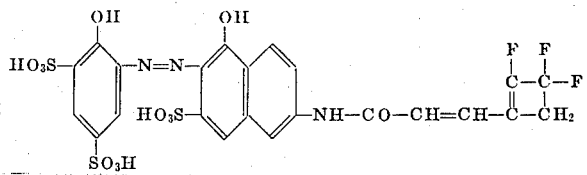

could be fixed on cotton in the presence of sodium hydroxide. By treatment with metal-yielding agents of copper, cobalt or chromium metal salts the dyestuff could be converted on the fiber into the corresponding complex-metal compounds.

In the manner described, if treating subsequently for instance with copper sulfate ruby red dyeings of good fastness to light and wet processing were obtained.

EXAMPLE 35

22.4 Parts of 6-chloro-2-aminophenol-4-sulfonic acid were diazotized as described in example 1. After adjusting the pH value to 7 the diazo solution was introduced into an aqueous sodium salt solution of 47.9 parts of 1-[β-(2',3',3'-trifluorocyclobutenyl-(1',2'))-acryloylamino]-8-hydroxynaphthalene-3,6-disulfonic acid and the mixture was heated for several hours at 35°–40° C. When the coupling was terminated the pH value was adjusted to 5 with dilute hydrochloric acid and the dyestuff was salted out with sodium or potassium chloride. The resulting dyestuff which in the form of the free acid corresponded to the formula

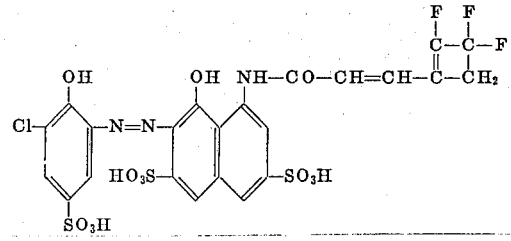

could, after the reaction with the fiber, be converted by means of metal-yielding substances in known manner into the corresponding metal-complex compounds. When applied on cellulose fibers in the presence of alkalies it yielded when subsequently coppered, a violet shade possessing a very good fastness to washing and light.

EXAMPLE 36

36.4 Parts of 6-amino-2-[β-(2',3',3'-trifluorocyclobutenyl-(1',2'))-acryloylamino]-phenol-4-sulfonic acid were diazotized as described in example 1. After a pH value of 7 had been set up with a sodium carbonate solution an aqueous sodium salt solution of 25.4 parts of 3-methyl-1-(4'-sulfophenyl)-pyrazolone-(5) was added thereto and the pH value was during the coupling reaction maintained at 7,0–7,5 by addition of sodium carbonate. The reaction mixture was stirred on for 12 hours at room temperature. After the pH value had been adjusted to 5 with dilute hydrochloric acid the monoazo dyestuff formed was isolated by spray drying. The dyestuff obtained which in the form of the free acid corresponded to the formula

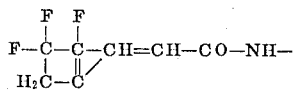
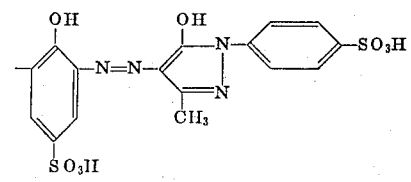

could be applied to cotton in the presence of sodium carbonate and be fixed by steam. When subsequently treated with a copper sulfate solution the cotton prints showed yellow brown shades of good fastness to light and wet processing.

We claim:

1. A process for producing fast dyeings or prints on cellulose fibrous materials, which comprises treating the said fibrous materials in any sequence with an alkaline agent and a water-soluble dyestuff of the formula

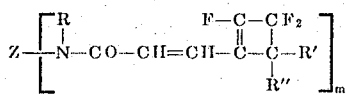

in which Z represents the radical of a water-soluble organic dyestuff molecule being linked to the identified side grouping directly or via the bridging member

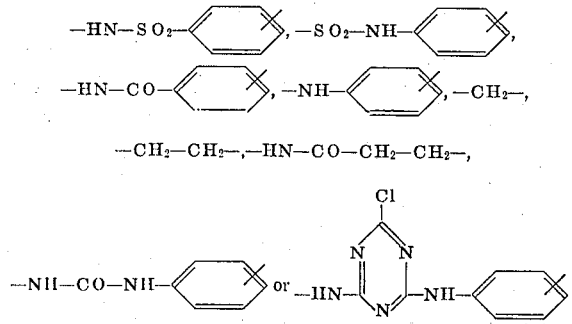

R represents hydrogen or lower alkyl, R' and R'' represent hydrogen, lower alkyl or phenyl and m represents the integer 1 or 2.

2. The process as claimed in claim 1, wherein the cellulose fibrous materials are padded or printed with an aqueous solution or printing paste containing a dyestuff of the identified structural formula and an alkaline agent, and subsequently exposed to a heat treatment at a temperature ranging from about 50° C. to about 160° C.

3. The process as claimed in claim 1, wherein the cellulose fibrous materials are padded with an aqueous solution containing a dyestuff of the identified structural formula and an alkali metal hydroxide, and the dyestuff is subsequently fixed by dwelling the padded materials in the air at a temperature ranging from about 15° C. to about 40° C.

4. The process as claimed in claim 1, wherein the cellulose fibrous materials are padded or printed with a neutral or acidic aqueous solution or printing paste containing a dyestuff of the identified structural formula, and the padded or printed fibrous materials are allowed to pass through an aqueous alkaline bath containing an alkali metal salt of a mineral acid, and subsequently exposed to a heat treatment at a temperature ranging from about 50° C. to about 160° C.

5. A process as claimed in claim 1 wherein said alkaline agent is an alkali metal hydroxide, carbonate, phosphate, borate, bicarbonate or salt of trichloroacetic acid or an alkaline earth metal hydroxide.

6. A process as claimed in claim 5 wherein said alkali metal is sodium or potassium.

7. A process as claimed in claim 1 wherein said alkaline agent is sodium hydroxide, sodium carbonate, sodium bicarbonate, trisodium phosphate, potassium hydroxide or potassium carbonate.

8. A process as claimed in claim 3 wherein said alkali metal is sodium or potassium.

9. A process as claimed in claim 2 wherein said alkaline agent is an alkali metal hydroxide, carbonate, phosphate, borate, bicarbonate or salt of trichloroacetic acid or an alkaline earth metal hydroxide.

10. A process as claimed in claim 4 wherein said alkaline agent is an alkali metal hydroxide, carbonate, phosphate, borate, bicarbonate or salt of trichloroacetic acid or an alkaline earth metal hydroxide and wherein said alkali metal is sodium or potassium.

* * * * *